United States Patent [19]

Murphy et al.

[11] 3,757,575

[45] Sept. 11, 1973

[54] WELL-LOGGING METHOD

[75] Inventors: Robert P. Murphy; William W. Owens; Dwight L. Dauben, Tulsa, Okla.

[73] Assignee: Amoco Production Company, Tulsa, Okla.

[22] Filed: July 9, 1971

[21] Appl. No.: 161,342

[52] U.S. Cl. ................................................ 73/152
[51] Int. Cl. ............................................ E21b 49/00
[58] Field of Search .................. 73/152; 324/10, 5; 250/83.6 W

[56] References Cited
UNITED STATES PATENTS 3,558,888   1/1971   Youmans ................. 250/83.6 W X

*Primary Examiner*—Jerry W. Myracle
*Attorney*—Paul F. Hawley and John D. Gassett

[57] ABSTRACT

This invention relates to determining the oil saturation in an underground rock reservoir by use of a log-inject-log technique. The formation rock adjacent the well bore is prepared such that the saturation conditions there are representative of those in the interwell area. A log such as an electric or thermal decay time log is then run. A driving fluid such as alcohol or a micellar fluid is injected to drive all of the fluid from the pore space in the volume of rock being logged. Then the driving fluid is displaced by a second driving fluid which has the same resistivity or thermal neutron capture cross-section as the formation water. The formation is then again logged by the same equipment as the first log run. The formation water saturation at the time the first log was run is then determined from these two logs.

13 Claims, No Drawings

WELL-LOGGING METHOD

BACKGROUND OF THE INVENTION

Field of the Invention

This invention relates to a method of logging a subsurface formation penetrated by a well bore to determine water saturation and subsequently the oil saturation. It particularly concerns a method which can be characterized as a log-inject-log technique.

SETTING OF THE INVENTION

Conventional Log Analyses

In the planning or engineering of the production of oil from an underground formation, it is most important to know the amount of oil in place. The oil in such underground reservoirs is contained in the pores of the rock. However, these pores contain more than oil. It is known that all such pores contain some water, commonly called connate water. Quite frequently these pores also contain gas.

There are ways of determining the percent of rock volume which is pore space. One such way is to cut a core, which typically is a cylindrical piece of the rock which is two to three inches in diameter and usually 20 to 30 feet at a time. After recovery of the core to the surface its porosity is determined. However, the knowledge of the porosity of the rock does not give a complete knowledge of the amount of oil in the rock. One must still determine what part of the core pore space is filled with water, what part with oil, and what part with gas. One can measure the quantities of gas, oil, and water in the core that has been brought to the surface and determine the water, oil, and gas saturations in the core. However, experience has shown that the fluid content of the core at the surface is seldom the same as was the fluid content of the core in its natural condition in the reservoir. There are several reasons for this. One is that when any drilling operation takes place in a borehole, and this includes cutting of cores, there is always fluid in the well bore. This fluid is usually what is referred to as a drilling mud. The drilling fluid, whether oil base or water base, usually causes some contamination of the core which is cut by invasion of the core by mud filtrate. If the core is cut using conventional or rubber sleeve core barrels, by the time it reaches the surface, the expansion of gas in the pore space and that which liberated from the oil upon removal of pressure, drives fluid from the core. There have been attempts made to overcome this problem. The most notable example is the use of a pressure core barrel. A pressure core barrel is merely a device inserted in the drill string near the bit. As the core is cut it is received into the core barrel. After the core is cut and is being held in the core barrel, valves are closed so that the core is completely sealed within the barrel. The sealed barrel is then raised to the surface and measurements are then made of the fluid content of the core. This system gives improved results but is quite expensive.

There are no logging devices available that can measure formation oil saturation directly. By formation oil saturation we mean that percent of the fluid in the pore space of the reservoir rock that is oil. There are devices, however, which can provide a measure of the water saturation. (It should be noted, however, that experience has shown that water saturations can only be computed from these logging devices with an accuracy of ±15 percent). If a gas saturation exists, it can be measured by an independent method such as described in U. S. Pat. No. 3,282,095. The oil saturation can then be computed by a difference of the pore space of the rock not filled with water or gas.

As mentioned above there are various devices available for obtaining a measure of the water saturation. The most common logging method is the electric log which includes induction, laterolog, short normal, long normal, lateral, etc. These type logs can only be run in uncased wells. Many different equations have been proposed for calculating water saturations from the recorded response of electric logs. Most of the useful equations are actually a modification of the Archie emperical equation shown below.

Electric Log $$(S_w)n = F\, R_w/R_t = R_0/R_t \tag{1}$$

where $S_w$ = formation water saturation, fraction of pore space.

$n$ = saturation exponent. Usually assumed $n = 2$, but should be determined by experience in area.

$F$ = formation resistivity factor. Usually derived from relationships with porosity ($\phi$) as measured by other logs (In sandstone formations the equations $F = 0.62/\phi^{2.15}$ is used.)

$R_w$ = resistivity of formation water, ohm meters.

$R_t$ = true resistivity of formation, ohm meters.

$R_0$ = resistivity of formation completely saturated with water, ohm meters.

These electric logs can be run only in well bores that have open hole completion. Most wells are provided with a casing which in reality is a steel pipe which is placed in a borehole. Cement is normally placed between the pipe and the borehole wall. This cemented casing keeps the hole from caving in and also serves to seal out fluids from zones other than the producing zones. Sometimes a casing is set just to the top of a producing formation and the formation is produced through an open hole. Other times a casing is set to the bottom of the hole and the casing is then perforated opposite the zone from which it is desired to produce the fluid or oil. The electric logs can be run before the casing is set or in an open hole. There are logs available for determining water saturation in wells which are cased. These are the thermal neutron decay time logs. The equation used in this interpretation is the equation No. 2 given below:

Thermal Decay Time Log $$S_w = \Sigma t - \Sigma r/\phi(\Sigma w - \Sigma hc) + \Sigma r - \Sigma hc/\Sigma w - \Sigma hc \tag{2}$$

where $\Sigma t$ = thermal neutron capture cross section of formation as measured by log.

$\Sigma w$ = thermal neutron capture cross section of formation water. Can be predicted from chemical analysis of water.

$\Sigma r$ = thermal neutron capture cross section of rock matrix. Is assumed from knowledge of lithology.

$\Sigma hc$ = thermal neutron capture cross section of formation hydrocarbons. Estimated from oil gravity and formation pressure and termperature.

$\phi$ = porosity, fraction of bulk volume. Determined from core data and/or porosity logs.

As can be seen from a study of equations 1 and 2, a number of different formation parameters must be known quite accurately to provide a reliable measure of the formation water saturations. As mentioned above, experience has shown that water saturations can be computed with an accuracy of only ±15 percent. Usually this is not adequate. Thus it is seen that there is a need for a method of providing better accuracy in determining water saturation so that a more accurate measure of the oil saturation can be determined. These determinations are most important in providing a basis for evaluating secondary and tertiary recovery prospects.

BRIEF DESCRIPTION OF THE INVENTION

This invention covers a log-inject-log technique that provides a reliable measure of formation water saturations which can be used in determining a reliable measure of formation oil saturations. We first prepare the well in such a manner that the saturation conditions in the vicinity of the well are representative of those in the interwell area. An electric log, or other suitable log, whose response is a function of the water saturation is first run. Then a first driving fluid, which is miscible with both the oil and connate water is injected to drive all the fluid including oil from the rock immediately adjacent the well bore. A suitable first driving fluid is alcohol or a micellar fluid. Then a second driving fluid is used to displace all of the first driving fluid from the pore space immediately surrounding the well bore. The second driving fluid has the same resistivity or neutron capture cross section as the formation water. After this, the formation is logged again in exactly the same manner as it was before the oil was displaced. By using the response of the two logs, one before and one after the injection of the displacing fluids, the formation water saturation at the time the first log was run can be determined without having to know as many variables as when only one log is run. Thus the accuracy is greatly increased.

DETAILED DESCRIPTION OF THE INVENTION

It is believed that the log-inject-log technique of this invention can best be explained by describing the procedure in the form of five steps.

Step I

The initial step is the conditioning of the well to produce as near as possible the same gas, oil, and water saturation adjacent the bore as that present in the rock formation remote from the well bore. All well logging techniques currently known measure physical properties of the rock formations and their fluid contents immediately adjacent the bore. There is some variation in effective depth of investigation, but at best this is only a few feet. On the other hand, it is well known to reservoir engineers that the relative content of gas, oil and formation water a considerable distance from the bore is frequently quite different from that near the bore. There are various reasons for this. For example, high production rates which usually result in a high pressure gradient between the well bore and the inner well area, frequently causes water or gas coning or gas liberation which alters the fluid saturation distribution of the formation near the well bore. As a different example, if a new well is drilled into a partly depleted formation, or if coring is carried out in an old well, the presence of the drilling fluid may introduce changes in saturations near the bore as compared to deeper in the formation. Thus, for example, if water or oil base mud is used in the drilling or coring, the filtrate will, depending upon the nature of the filtrate, cause too high a water or oil saturation in the core. Thus it is clear that it is desirable before commencing the logging operation to restore the formation as nearly as possible to the steady-state conditions.

In general, we can usually condition the formation adjacent the well bore by controlled production. We produce the well at a very slow rate so as to have a small pressure drop between the well bore and the formation remote from the well. This permits the liquids present in the reservoir formation immediately adjacent the bore to approximate the saturations prevailing a considerable distance from the well bore in the reservoir rock. Thus the relative fluid content of the reservoir rock adjacent the well bore approaches the steady-state condition which exists in most of the reservoir.

One satisfactory initial step in a partly depleted reservoir having a known gas saturation greater than 20 to 30 percent pore space, if economics do not rule it out, is to drill a new well into a reservoir using gas under pressure as a drilling fluid. We have found that under these conditions the liquid saturations in the rock immediately surrounding the well bore are usually very little affected by the drilling operations.

Step I teaches to condition the well to produce as near as possible the same gas, oil, and water saturation adjacent the bore as that present in the rock formation remote from the well bore. This step is essential whether gas saturation exists or not. However, it is to be noted that the overall procedure of this invention is slightly different for those situations where gas saturation exists and those where it does not. In continuing the explanation of our invention and particularly involving Steps II through V, it will first be assumed that no gas saturation exists in the rock pore space. We will later describe a process for dealing with those situations in which gas saturation does occur.

Step II — Running a First Log

The next step involves running through the well bore adjacent the rock reservoir of interest a logging tool whose response is a function of the water saturation in the rock surrounding the well bore. A conventional electric log (in an uncased well) or a thermal neutron decay time log is quite suitable. These logs have a response which are useful in Equations 1 or Equations 2 above; however, in this procedure we do not need to solve Equation 1 or 2.

Step III — Driving all Oil out of the Rock Formation Being Logged

We next inject a first driving fluid through the well bore into the reservoir rock to displace all the oil from the pore space in the formation of rock investigated by the logging device. This first driving fluid should be miscible with both the reservoir oil and with the connate water. What we want to do is to reduce the oil saturation to zero in the volume of rock investigated.

Injection of solvent followed by alcohol is one process by which the oil saturation can be removed. The lead solvent should be a low molecular weight hydrocarbon, preferably containing some aromatics. Suitable solvents include condensates, light gasolines, and aromatic cut solvents such as reformate or ultraformate.

The composition of the solvent is designed for a two fold purpose: (1) to be effective in dissolving organic deposits, and (2) to provide the proper phase relationships to permit efficient displacement of the solvent and alcohol by the drive water. It is recognized that direct contact of alcohols with some crude oils can cause asphaltene precipitation, particularly in low API gravity crudes.

Injection of a micellar solution followed by water can also reduce the residual oil saturation to a zero level. Micellar solutions suitable for this invention are composed of a hydrocarbon, water, petroleum or snythetic sulfonate surfactant, and an alcohol co-surfactant. A preferred composition is sold commercially by Amoco Chemical Company of Houston, Texas as Amoco Wel-laid 220 micellar concentrate (water-free components). The micellar solution may be prepared by mixing together a locally available fresh water with added sodium chloride and the micellar concentrate. A 50 percent water (containing 9,000 ppm added NaCl) micellar solution is believed to be adequate for most applications. Where the matrix permeability is very low (e.g., <10 md) it may be desirable to inject ahead of and behind the 50 percent slug one or more higher water "buffer" micellar solutions. This procedure avoids any permeability reductions that might otherwise occur while injecting a single slug. In most low permeability applications a single 80 percent buffer slug will be sufficient. Other micellar solutions suitable for the practice of this invention are "Cleansweep" solutions sold by Dowell Division of the Dow Chemical Company, 1579 East 21st St., Tulsa, Okla. 74114.

Micellar solutions are preferred to alcohols for this invention because of their lower unit cost and greater efficiency in displacing oil. The micellar solutions also by virtue of their higher viscosity (22 cp compared to 2 cp at room temperature) invade more of the tighter portions of the reservoir rock than do alcohols.

If formation water is saline, it may be necessary to precede the alcohol or micellar injection with fresh water to displace the salt water for protection. A micellar slug can emulsify upon contact with a high salinity water. An alcohol can precipitate salts upon contact with a high salinity water.

Step IV - Driving the first driving fluid from the investigated pore space by a second driving fluid having similar characteristics to the connate water.

A second driving fluid is injected to drive the first driving fluid from the pore space being investigated. This fluid is preferably water that has the same resistivity or thermal neutron capture cross section as the water in the formation at the time the first log was run. If produced formation water from the reservoir is available for injection, it is usually preferred. This is easily accomplished by obtaining a sample of the formation water in any known method. The second driving fluid can then be water with the proper amount of salt added to give the same salinity. If the formation water to be injected after the alcohol or micellar solution is "salty," it is desirable to use a fresh water blanket ahead of the formation water.

Step V — Rerun the Identical Logging Technique of Step 2

This step is merely the rerun of the identical logging procedure of Step 2.

Determine water saturation from logs of Step II and Step V

By using the response of the two logs obtained in Steps II and V, the formation water saturation at the time the first log was run can be computed from the appropriate one of greatly simplified Equations (3) and (4) shown below. Equation (3) is for electric logs and Equation (4) is for thermal neturon decay time logs.

Electric Logs $$(S_{w1})^n = R_o/R_t = R_{t2}/R_{s1} \quad (3)$$

where
$S_{w1}$ = formation water saturation of formation prior to injection, fraction of pore space.
$R_{t1}$ = resistivity of formation prior to injection (first log), ohm meters.
$R_{t2}$ = resistivity of formation after injecting an alcohol or micellar fluid followed by formation water (second log), ohm meters.

Equation (3) is a simple adaptation of Equation (1) to the responses of logs run in Steps II and V. $R_o$ is the resistivity of the formation rock completely saturated with formation water. The response of the second log $R_{t2}$ is also the resistivity of the formation when completely flooded by water having the same resistivity as the original connate water. Thus one can substitute $R_{t2}$ for $R_o$ in Equation (1). $R_t$ in Equation (1) is the measure of the resistivity of the formation and is the electrical log response or $R_{t1}$ of Step II. Thus $R_{t1}$ can be substituted into Equation (1) for the term $R_t$. The response of the second log run in Step V divided by the response of the first log run in Step II is equal to $(S_{w1})^n$. This is the formation water saturation prior to the first injection. The only unknown factor in that term is the exponential factor $n$ which can be determined by known methods.

The saturation exponent $n$ is usually assumed to be 2.0 in clean, consolidated, water-wet sands. However, this value does not apply to all formations. It can be determined by laboratory measurements on native state cores or it can be back calculated from native state core water saturations and the response of electric logs. For a discussion of how this factor can be determined see, *Hand Book of Well Log Analysis*, by S. J. Pirson and published by Prentice-Hall Inc., Englewood Cliffs, N. J. 1963.

As will be seen as we proceed, if we run both electric logs and thermal neutron decay time logs in both Steps II and V, we can actually determine the factor $n$ for a particular reservoir and use it for calculations in other log analyses for that reservoir which are not discussed herein.

The thermal neutron decay time log equations can be simplified in the form given in Equation (4).

Thermal Neutron Decay Time Logs $$S_{w1} = 1 - \Sigma_2 - \Sigma_1/\phi \ (\Sigma_w - \Sigma_{hc}) \quad (4)$$

where
$\Sigma_1$ = thermal neutron capture cross section of formation prior to injection (first log).
$\Sigma_2$ = thermal neutron capture cross section of formation completely saturated with formation water (second log, Step V).

The following shows how one obtains Equation 4 from the thermal neutron time decay logs obtained in Steps II and V.

$$S_{w1} = \Sigma_1 - \Sigma_R/\phi\ (\Sigma_w - \Sigma_{hc}) + \Sigma_R - \Sigma_{hc}/\Sigma_w - \Sigma_{hc}$$

where
$S_{w1}$ = actual water saturation of formation before injection of micellar solutions.

$$S_{w2} = 1.0 = \Sigma_2 - \Sigma_R/\phi\ (\Sigma_w - \Sigma_{hc}) + \Sigma_R - \Sigma_{hc}/\Sigma_w - \Sigma_{hc}$$

where
$S_{w2}$ = water saturation of formation after injection of micellar solutions and salt water (Step IV). Formation is completely saturated with salt water, thus $S_{w2} = 1.0$.

$1.0 - S_{w1} = \Sigma_2 - \Sigma_R/\phi\ (\Sigma_u - \Sigma_{hc}) + \Sigma_R - \Sigma_{hc}/\Sigma_w - \Sigma_{hc} - \Sigma_1 - \Sigma_R/\phi\ (\Sigma_w - \Sigma_{hc}) - \Sigma_R - \Sigma_{hc}/\Sigma_w - \Sigma_{hc}$ $1 - S_{w1} = \Sigma_2 - \Sigma_R/\phi\ (\Sigma_w - \Sigma_{hc}) - \Sigma_1 - \Sigma_R/\phi\ (\Sigma_w - \Sigma_{hc}) = \Sigma_2 - \Sigma_R - \Sigma_1 - \Sigma_R/\phi\ (\Sigma_w - \Sigma_{hc})$ $1 - S_{w1} = \Sigma_2 - \Sigma_1/\phi\ (\Sigma_w - \Sigma_{hc})$ $S_{w1} = 1 - \Sigma_2 - \Sigma_1/\phi\ (\Sigma_w - \Sigma_{hc})$ Thus, the ratio of the measured resistivities of the two electric logs or the difference in capture cross section between the two thermal neutron decay time logs eliminates the need for reliable measures of the formation factors and capture cross sections of the rock matrix as used in previous equations. Therefore, the log-inject-log procedure outlined provides more accurate determinations of the formation water saturation. If a gas saturation does not exist in the formation, the oil saturation is computed by difference as the pore space not filled with water. The accuracy expected of this log-inject-log procedure is in the range of ±5 saturation percent.

If Rock Formation Contains Gas

If it is known or suspected that the pore volume being investigated contains gas, the saturation of gas must be determined. A suitable method is described in U.S. Pat. No. 3,282,095. We modified the above procedure set forth in Steps 1 through V by obtaining a measure of gas saturation following the method of that patent after Step II and before Step III. As soon as that gas saturation determination technique is completed we proceed with Steps III, IV and V. We make sure that the second driving fluid of Step III can displace any liquid injected into the rock by the gas saturation determination technique. We also make sure that the second driving fluid has the same salinity as that of the connate water.

The log-inject-log procedure of this invention can be used to measure the water saturation in a formation at any time during its history. It can be used to measure the initial or connate water saturation or it can be used to evaluate the effectiveness of such recovery techniques as a waterflood, a caustic flood, or a micellar flood. To perform such an evaluation of the effectiveness of such floods is to run Step II (and Step 1 if necessary) before the flooding operation starts. Then at some time during the life of the flood perform Steps III, IV and V. (Or perform Steps II thru V to determine the water saturation and from that the oil saturation at that point in the recovery method.)

Another advantage to our system is that we can accurately determine the exponent $n$. We can determine $S_{w1}$ from Equation (4) and we determine a value for the term $(S_{w1})^n$ in Equation (3). Thus the exponent factor $n$ can be obtained.

Although the above description has been done in considerable detail, it is possible to make modifications in the procedure without departing from the spirit or scope of the invention.

We claim:

1. A method of measuring water saturation in a subsurface zone penetrated by a well bore which comprises the steps of:
    a. running a logging instrument in said well bore to measure the water saturation of the rock in said zone adjacent said well bore,
    b. injecting a driving fluid through said well bore into said zone to displace oil out of the rock immediately surrounding the well bore, said driving fluid being a fluid easily driven through the rock by a second driving fluid having the same logging characteristics as the water in the rock at the time of Step (a),
    c. injecting said second driving fluid through said well bore into said zone to drive said first driving fluid from the zone immediately adjacent the well bore, and
    d. after Step (c), repeating Step (a).

2. A method as defined in claim 1 in which said Step (a) and (d) is the running of an electric log.

3. A method as defined in claim 1 in which Step (a) is the running of a thermal neutron decay time log.

4. A method as defined in claim 1 in which said first driving fluid is a micellar solution having mutual solubility in oil and in water.

5. A method as defined in claim 4 which comprises the step of injecting a fresh water slug before Step (c).

6. A method as defined in claim 5 which includes the step of injecting fresh water after Step (c).

7. A method as defined in claim 1 in which both an electric log and a thermal neutron decay time log are run first before and then after Steps 3 and 4.

8. A method as defined in claim 1 in which said first driving fluid is an alcohol solution.

9. A method as defined in claim 1 in which the said first driving fluid is an alcohol solution having mutual solubility in oil and in water.

10. A method as defined in claim 9 which includes injecting fresh water immediately before the injection of the said alcohol solution and before Step (c).

11. A method as defined in claim 1 in which before Step (a) the well is conditioned to produce as near as possible the same fluid saturation adjacent the bore as that present in the rock formation remote from the well bore.

12. A method as defined in claim 1 when used in a zone having gas saturation, the method including the step of running logs to determine the gas saturation, such logs to be run after Step (a) and before Step (b).

13. A method of measuring water saturation in a subsurface zone penetrated by a well bore which comprises the steps of:
    1. measuring the water saturation of the rock in said zone adjacent said well bore,
    2. thereafter reducing to zero the oil saturation of the rock immediately surrounding the well bore,
    3. filling the pore space of the rock adjacent the well bore with a fluid having the same logging characteristics as the water in the rock at the time of Step 1),
    4. after Step 3 again measuring the water saturation of the rock in said zone adjacent said well bore.

* * * * *